(12) United States Patent
Braic et al.

(10) Patent No.: US 9,097,466 B2
(45) Date of Patent: Aug. 4, 2015

(54) HEAT EXCHANGER

(75) Inventors: Viorel Braic, Stuttgart (DE); Roland Hemminger, Esslingen (DE); Daniel Hendrix, Stuttgart (DE); Mark Schienemann, Stuttgart (DE); Erwin Skiba, Stuttgart (DE); Danijel Budimir, Remseck am Neckar (DE); Jochen Kaeser, Stuttgart (DE)

(73) Assignee: MAHLE Behr GmbH & Co. KG, Stuttgart (DE)

(*) Notice: Subject to any disclaimer, the term of this patent is extended or adjusted under 35 U.S.C. 154(b) by 915 days.

(21) Appl. No.: 12/578,126

(22) Filed: Oct. 13, 2009

(65) Prior Publication Data

US 2010/0089548 A1   Apr. 15, 2010

Related U.S. Application Data

(63) Continuation of application No. PCT/EP2008/002904, filed on Apr. 11, 2008.

(30) Foreign Application Priority Data

Apr. 11, 2007  (DE) .................. 10 2007 017 330
Jun. 22, 2007  (DE) .................. 10 2007 029 300
Mar. 14, 2008  (DE) .................. 10 2008 014 163

(51) Int. Cl.
*F24D 19/02*  (2006.01)
*F28F 7/02*  (2006.01)
(Continued)

(52) U.S. Cl.
CPC .......... *F28D 7/1692* (2013.01); *F02B 29/0462* (2013.01); *F28F 9/0219* (2013.01);
(Continued)

(58) Field of Classification Search
CPC .......... B60H 1/18; F28D 9/04; F28D 9/0025; A23L 3/22; F28F 7/02; Y10T 403/64
USPC ............. 165/51, 66, 164, 149, 166, 165, 158, 165/906
See application file for complete search history.

(56) References Cited

U.S. PATENT DOCUMENTS 31,889 A     11/1899  Gill
1,877,068 A * 9/1932  Shoop ......................... 165/164
(Continued)

FOREIGN PATENT DOCUMENTS

CN  2446487 Y  9/2001
CN  1813164 A  8/2006
(Continued)

*Primary Examiner* — Judy Swann
*Assistant Examiner* — Claire Rojohn, III
(74) *Attorney, Agent, or Firm* — Muncy, Geissler, Olds & Lowe, P.C.

(57) ABSTRACT

A heat exchanger, particularly for charge air or exhaust gas, performs heat exchange between a first fluid and a second fluid, and includes heat exchanging guides for the first and second fluids, the guides being separated from each other in a core, the core having a plurality of flow channels through which the first fluid flows, and a housing that receives the flow channels and through which the second fluid flows. The heat exchanger also includes at least one compartment lid, which is flow-connected to the flow channels, and a base that is attached to the compartment lid and that is equipped with one or more passage openings for flow channels. The compartment lid is attached to the base via one or more connections which connections are bolted connections and/or a slotted crimping.

39 Claims, 14 Drawing Sheets

(51) Int. Cl.
| | |
|---|---|
| *F28D 7/10* | (2006.01) |
| *F28D 1/00* | (2006.01) |
| *F28D 7/16* | (2006.01) |
| *F28F 9/02* | (2006.01) |
| *F02B 29/04* | (2006.01) |
| *F28D 21/00* | (2006.01) |

(52) U.S. Cl.
CPC ..... *F28D21/0003* (2013.01); *F28D 2021/0082* (2013.01); *F28F 2275/122* (2013.01); *Y02T 10/146* (2013.01)

(56) References Cited

U.S. PATENT DOCUMENTS

| | | | | |
|---|---|---|---|---|
| 2,606,007 | A * | 8/1952 | Simpelaar | 165/166 |
| 2,687,626 | A * | 8/1954 | Bartlowe | 62/276 |
| 3,272,260 | A * | 9/1966 | Raub et al. | 165/164 |
| 3,334,399 | A * | 8/1967 | Teeguarden | 29/890.039 |
| 3,375,570 | A * | 4/1968 | Dubusker et al. | 228/183 |
| 3,907,032 | A * | 9/1975 | DeGroote et al. | 165/166 |
| 4,084,564 | A * | 4/1978 | Rickert | 123/514 |
| 4,331,201 | A * | 5/1982 | Hesse | 165/153 |
| 4,384,611 | A * | 5/1983 | Fung | 165/166 |
| 4,408,661 | A * | 10/1983 | Eastman et al. | 165/158 |
| 4,423,708 | A * | 1/1984 | Sweetland | 123/196 AB |
| 4,542,623 | A * | 9/1985 | Hovan et al. | 60/226.1 |
| 4,706,461 | A * | 11/1987 | Pratt et al. | 60/599 |
| 4,823,868 | A * | 4/1989 | Neebel | 165/178 |
| 5,029,640 | A * | 7/1991 | Niggemann | 165/164 |
| RE33,912 | E * | 5/1992 | Lapkowski | 165/166 |
| 5,228,515 | A * | 7/1993 | Tran | 165/166 |
| 5,915,472 | A * | 6/1999 | Takikawa et al. | 165/158 |
| 5,931,228 | A * | 8/1999 | Kalbacher et al. | 165/51 |
| 6,059,025 | A * | 5/2000 | Hossfeld | 165/166 |
| 6,071,593 | A * | 6/2000 | Lang et al. | 428/167 |
| 6,082,446 | A * | 7/2000 | Ahaus et al. | 165/173 |
| 6,123,144 | A * | 9/2000 | Morman et al. | 165/104.32 |
| 6,206,086 | B1 * | 3/2001 | McKey | 165/76 |
| 6,216,772 | B1 * | 4/2001 | Johannesson | 165/119 |
| 6,247,523 | B1 * | 6/2001 | Shibagaki et al. | 165/51 |
| 6,250,381 | B1 * | 6/2001 | Nishishita | 165/175 |
| 6,269,870 | B1 * | 8/2001 | Banzhaf et al. | 165/158 |
| 6,408,941 | B1 * | 6/2002 | Zuo | 165/165 |
| 6,595,274 | B2 * | 7/2003 | Hayashi et al. | 165/158 |
| 6,662,863 | B2 * | 12/2003 | Igami et al. | 165/174 |
| 6,684,938 | B2 * | 2/2004 | Tsujita et al. | 165/51 |
| 6,779,591 | B2 * | 8/2004 | Ehlers et al. | 165/166 |
| 6,789,612 | B1 * | 9/2004 | Okamoto et al. | 165/104.34 |
| 6,802,365 | B2 * | 10/2004 | Huguet et al. | 165/166 |
| 6,848,501 | B2 * | 2/2005 | Hirao et al. | 165/119 |
| 6,899,169 | B1 * | 5/2005 | Cox | 165/159 |
| 6,910,528 | B2 * | 6/2005 | Abiko et al. | 165/166 |
| 6,920,918 | B2 * | 7/2005 | Knecht et al. | 165/157 |
| 6,942,017 | B2 * | 9/2005 | Gokan et al. | 165/51 |
| 6,997,238 | B1 * | 2/2006 | Ruthy et al. | 165/41 |
| 7,121,325 | B2 * | 10/2006 | Kruger et al. | 165/157 |
| 7,121,329 | B2 * | 10/2006 | Shields et al. | 165/149 |
| 7,195,055 | B1 * | 3/2007 | Jaeger | 165/51 |
| 7,278,473 | B2 * | 10/2007 | Brunner et al. | 165/158 |
| 7,406,998 | B2 * | 8/2008 | Kudo | 165/10 |
| 7,478,630 | B2 * | 1/2009 | Maucher et al. | 123/568.12 |
| 7,743,816 | B2 * | 6/2010 | Mercz et al. | 165/11.1 |
| 7,984,753 | B2 * | 7/2011 | Ohfune et al. | 165/166 |
| 8,100,171 | B2 * | 1/2012 | Zebuhr | 165/164 |
| 8,261,815 | B2 * | 9/2012 | Schienemann et al. | 165/158 |
| 2002/0144801 | A1 * | 10/2002 | Gokan et al. | 165/51 |
| 2003/0010479 | A1 * | 1/2003 | Hayashi et al. | 165/157 |
| 2004/0069468 | A1 * | 4/2004 | Lamich et al. | 165/148 |
| 2004/0107949 | A1 * | 6/2004 | Miyoshi et al. | 123/568.12 |
| 2004/0226694 | A1 | 11/2004 | Dilley et al. | |
| 2005/0006067 | A1 | 1/2005 | Hoglinger et al. | |
| 2005/0034847 | A1 * | 2/2005 | Graham et al. | 165/158 |
| 2005/0039729 | A1 * | 2/2005 | Rosin et al. | 123/568.12 |
| 2005/0199227 | A1 * | 9/2005 | Juschka et al. | 123/568.12 |
| 2005/0252646 | A1 * | 11/2005 | Watanabe | 165/165 |
| 2005/0263272 | A1 * | 12/2005 | Brunner et al. | 165/158 |
| 2005/0284619 | A1 * | 12/2005 | Valensa et al. | 165/164 |
| 2006/0048926 | A1 * | 3/2006 | Richter | 165/165 |
| 2006/0219394 | A1 * | 10/2006 | Martin et al. | 165/157 |
| 2007/0039722 | A1 * | 2/2007 | Angermann | 165/158 |
| 2007/0074848 | A1 * | 4/2007 | Andritter | 165/51 |
| 2007/0125527 | A1 * | 6/2007 | Flik et al. | 165/140 |
| 2007/0175612 | A1 * | 8/2007 | Hendrix | 165/101 |
| 2007/0181294 | A1 * | 8/2007 | Soldner et al. | 165/175 |
| 2007/0193732 | A1 * | 8/2007 | Oofune et al. | 165/164 |
| 2007/0295483 | A1 * | 12/2007 | Beck et al. | 165/104.11 |
| 2008/0093060 | A1 * | 4/2008 | Beck et al. | 165/164 |
| 2008/0115923 | A1 * | 5/2008 | Yamanaka et al. | 165/276 |
| 2008/0121384 | A1 * | 5/2008 | Tseng | 165/149 |
| 2008/0135221 | A1 * | 6/2008 | Nakamura | 165/165 |
| 2008/0223562 | A1 * | 9/2008 | Braic et al. | 165/158 |
| 2009/0090486 | A1 * | 4/2009 | Geskes et al. | 165/51 |
| 2009/0090495 | A1 * | 4/2009 | Domes et al. | 165/165 |
| 2010/0071871 | A1 * | 3/2010 | Gaensler et al. | 165/51 |
| 2010/0084111 | A1 * | 4/2010 | Jaeger et al. | 165/41 |
| 2010/0186397 | A1 * | 7/2010 | Emrich et al. | 60/320 |
| 2010/0263610 | A1 * | 10/2010 | Mercz et al. | 123/41.09 |
| 2012/0292002 | A1 * | 11/2012 | Saumweber et al. | 165/164 |
| 2013/0192803 | A1 * | 8/2013 | Garret et al. | 165/151 |

FOREIGN PATENT DOCUMENTS

| | | |
|---|---|---|
| DE | 28 52 408 A1 | 6/1980 |
| DE | 3841470 A1 | 6/1990 |
| DE | 42 43 495 A1 | 6/1994 |
| DE | 199 02 504 A1 | 8/2000 |
| DE | 199 27 607 A1 | 12/2000 |
| DE | 199 53 785 A1 | 5/2001 |
| DE | 101 58 436 A1 | 6/2003 |
| DE | 10 2004 047 901 A1 | 6/2005 |
| DE | 10 2004 045 021 A1 | 4/2006 |
| DE | 10 2004 051 207 A1 | 5/2006 |
| DE | 10 2005 012 761 A1 | 9/2006 |
| EP | 1 348 924 A | 10/2003 |
| FR | 2 092 687 A | 1/1972 |
| FR | 2 855 605 A | 12/2004 |
| JP | 62 033031 A | 2/1987 |
| JP | 08 291995 A | 11/1996 |
| JP | 11-159993 A | 6/1999 |
| JP | 11 159993 A | 6/1999 |
| WO | WO 2004/009457 A1 | 1/2004 |
| WO | WO 2004/065874 A | 8/2004 |
| WO | WO 2004/113815 A | 12/2004 |
| WO | WO 2007/031274 | 3/2007 |
| WO | WO 2007/031274 A | 3/2007 |
| WO | WO 2007/048603 A | 5/2007 |
| WO | WO 2007/082774 A | 7/2007 |
| WO | WO 2008/003486 A | 1/2008 |

* cited by examiner

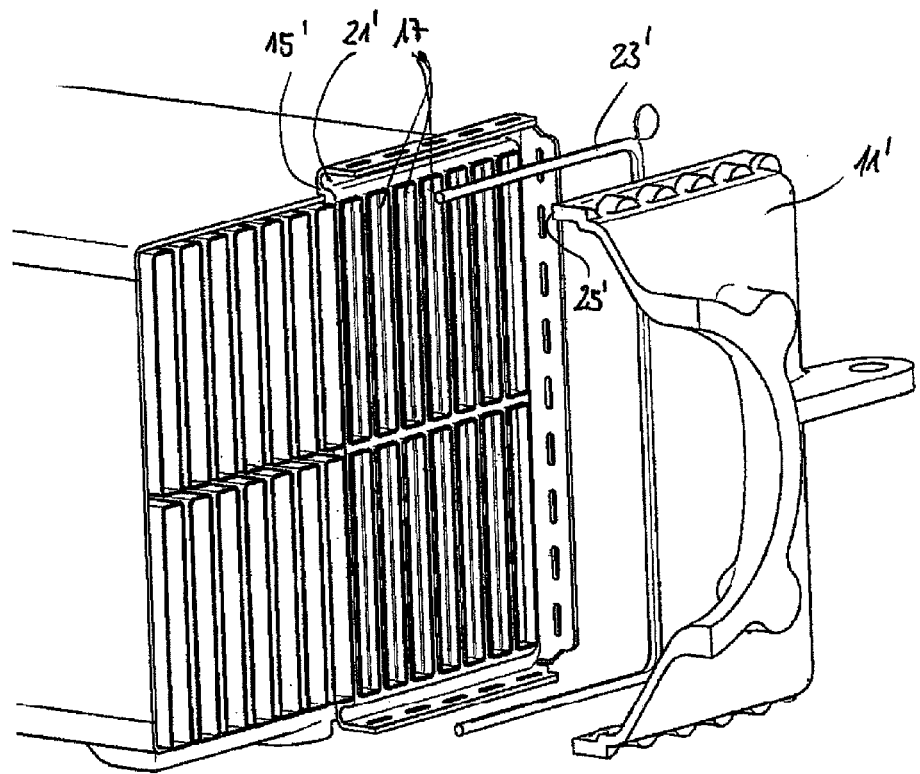
Fig.7
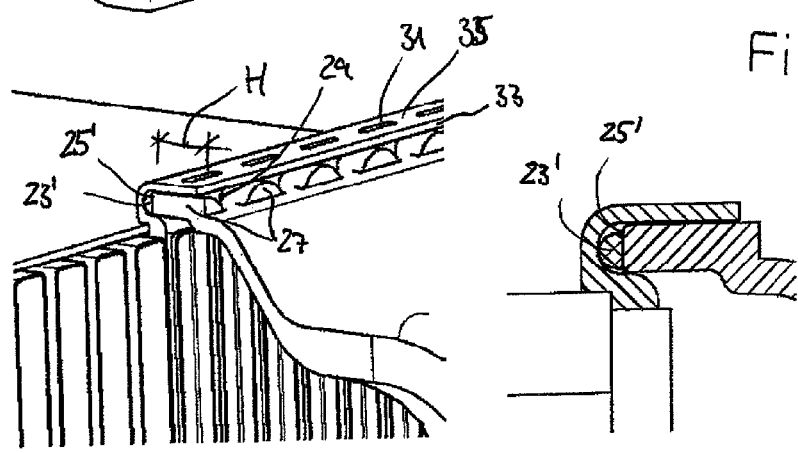
Fig.8
Fig.9

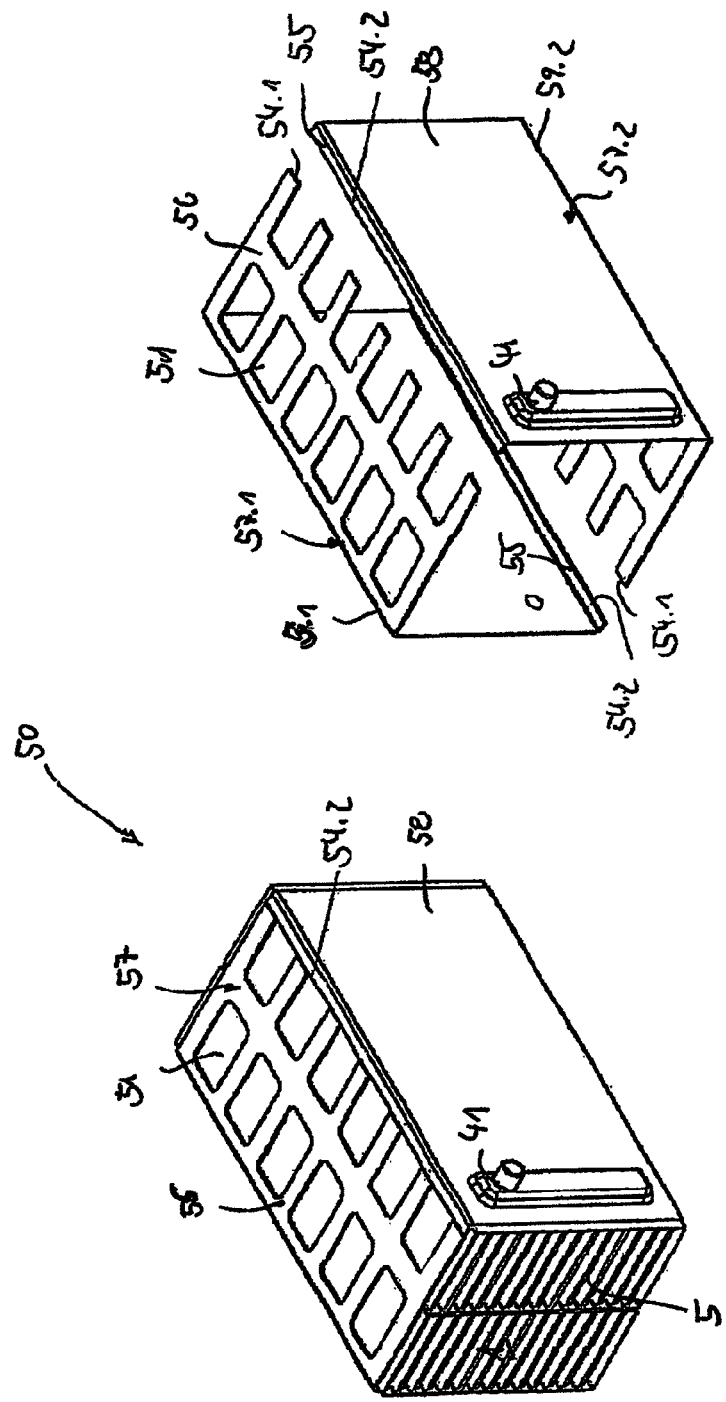

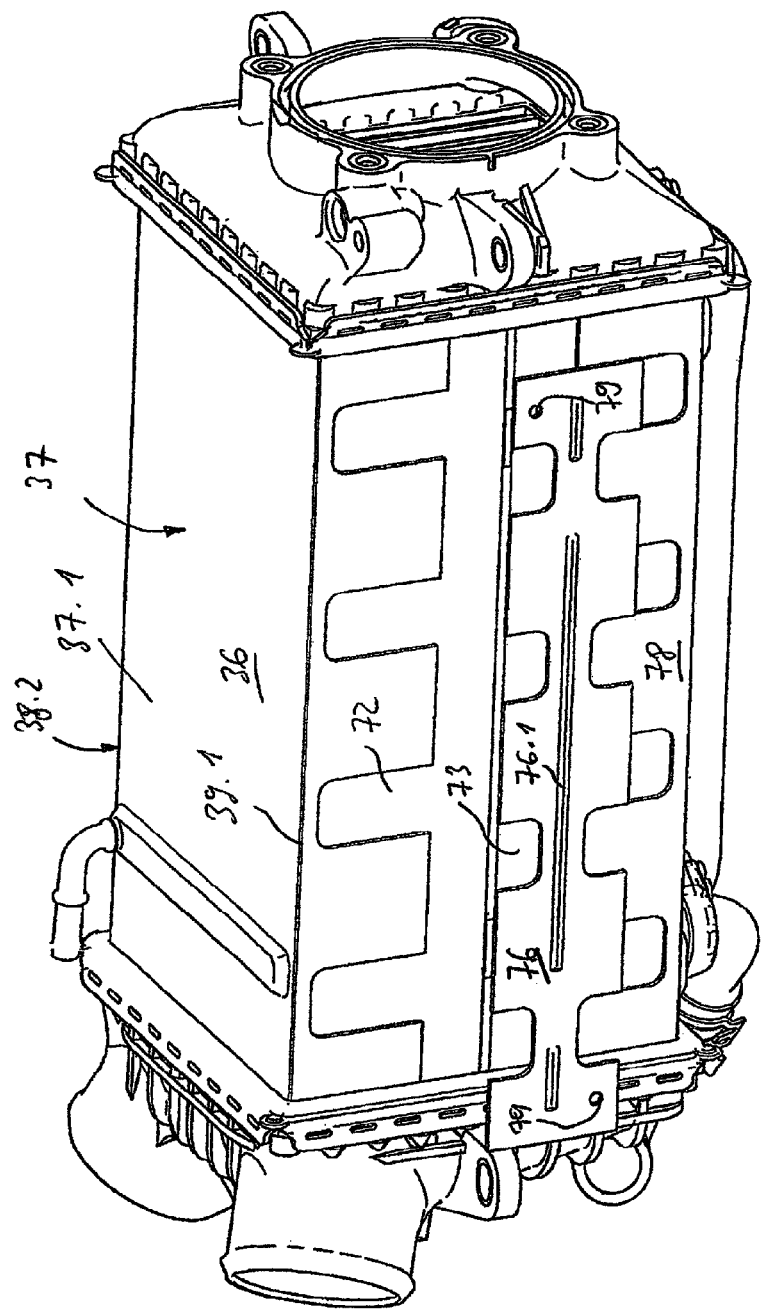

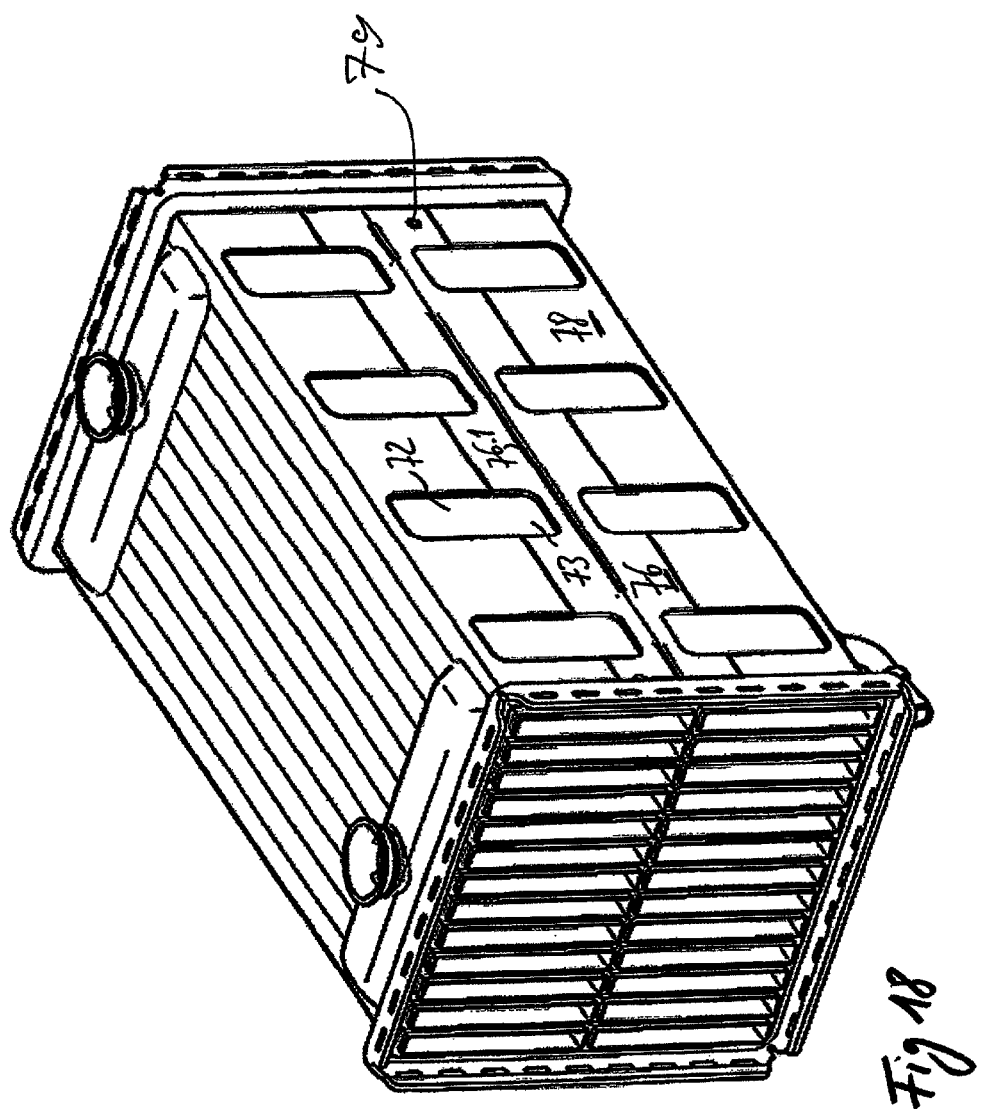

HEAT EXCHANGER

This nonprovisional application is a continuation of International Application No. PCT/EP2008/002904, which was filed on Apr. 11, 2008, and which claims priority to German Patent Application Nos. DE 102007017330, DE 102007029300, and DE 102008014163, which were filed in Germany on Apr. 11, 2007, Jun. 22, 2007, and Mar. 14, 2008, respectively, and which are all herein incorporated by reference.

BACKGROUND OF THE INVENTION

1. Field of the Invention

The present invention relates to a heat exchanger for heat exchange between a first fluid and a second fluid, the heat exchanger includes a core for guidance of the first and second fluid separately from one another and in a heat-exchanging manner, which core has a number of flow channels that can be flowed through by the first fluid and a housing accommodating the flow channels, which housing can be flowed through by the second fluid; at least one case cover that is flow-connected to the flow channels; and a base, which is fixed to the cover and is provided with one or more through openings for flow channels. The invention further relates to a use of the heat exchanger.

2. Description of the Background Art

With a known heat exchanger, a case cover can be formed from deep-drawn sheet metal, which is soldered to the core during the production process. Although this has advantages in the high-temperature range, attachment elements such as, e.g., holders or flanges for sensors must be produced as additional parts from sheet metal and connected to the case cover before the soldering, which makes the production process more complicated. Furthermore, a more complex case shape can generally no longer be produced as a deep-drawn part, so that in this case a casting production must be carried out and the case cover must generally be welded to the core. This type of case has proven to be comparatively expensive and complex to produce, particularly with more complex designs.

A more cost-effective alternative to heat exchangers of this type is a heat exchanger of the type mentioned at the outset, in which the case has a case cover of plastic. Here comparatively complex designs can be realized, wherein higher temperature ranges can definitely be realized with corresponding plastic materials and a corresponding design of the case. Examples of case covers of plastic are given in DE 10 2004 051 207 A1 and DE 10 2004 047 901 A1, which corresponds to U.S. Publication No. 20070175612, and which are all herein incorporated by reference.

There are fundamentally different ways of attaching a plastic case cover to the heat exchanger, thus, for example, attachments such as are shown in WO 2004/09457, FIG. 2 or DE 199 53 785 A1, FIG. 4, which is also herein incorporated by reference.

DE 10 2005 012 761 A1 discloses a heat exchanger mentioned at the outset with a housing of two side parts and two housing covers, wherein the side parts are soldered to the core and the housing covers are welded to the side parts. Furthermore, collecting boxes of plastic are mechanically connected to tube sheets with the interposition of a seal. The mechanical connection is carried out by bending tabs of the tube sheets over the edge of the collecting box. This type of heat exchanger is in need of improvement.

SUMMARY OF THE INVENTION

It is therefore an object of the present invention to provide an improved connection of a case cover, in particular a case cover of a non-metal material to a metal part, on a heat exchanger, preferably taking into account an improved sealing effect. An improvement of the housing is also desirable.

In an exemplary embodiment, a heat exchanger is provided, in which the case cover of a case is connectable to a base, in which the case cover of a non-metal material is attached to the metal base, preferably while improving a sealing effect. In particular, a further object of the invention is to provide a heat exchanger with an improved housing.

The object is attained with a heat exchanger of the type mentioned at the outset in which it is provided according to the invention that the case cover is fixed, preferably connected to the base via one or more connections, such as, via a threaded connection and/or slot flange. This concept according to the invention has proven to be advantageous, for example, in the event that the case cover and the base are composed of different materials.

A heat exchanger of the type mentioned at the outset can be formed in particular as a charge-air heat exchanger, in which the first fluid is a charge air, or as an exhaust gas heat exchanger, in which the first fluid is an exhaust gas. The first fluid can also be an exhaust gas/charge air mixture or the like fluid for charging an internal combustion engine. The second fluid, in particular a coolant, is, for example, a water-based or other expedient coolant.

The invention is based on the concept that a connection of a case cover, in particular made of non-metal, for example, a plastic, fibrous composite or a ceramic, should be comparatively secure and, on the other hand, sufficiently flexible with respect to thermal relative movements of the base, which is preferably composed of metal, e.g., aluminum and a base cover. The invention has recognized that to this end a threaded connection or a slot flange or a combination of a threaded connection and a slot flange is suitable in a superior manner compared to known types of connection. A connection type according to the concept of the invention thus renders possible a particularly cost-effective connection of a base cover, e.g., of metal, but in particular of non-metal, to an otherwise metallic construction of a heat exchanger, so that in particular even more complex case forms are rendered possible while avoiding more expensive production methods.

A heat exchanger in the form of a charge-air heat exchanger, in particular a charge-air cooler, which has the features according to the concept of the invention, has proven to be particularly preferred as a further development of the invention. The problems set forth above have resulted in particular with plenum chambers, wherein due to installation space restrictions in the front of the vehicle, indirect charge-air cooling is becoming increasingly popular in this area. In this context, a further development leads in a particularly preferred manner to the use of the heat exchanger according to the concept of the invention as a charge-air cooler for indirect cooling of charge air in a charge-air system for an internal combustion engine of a motor vehicle.

Furthermore, the inventive concept can also be realized in a heat exchanger as is described in the applicant's German patent application DE 10 2008 018 594, which is incorporated herein by reference. A heat exchanger of the type mentioned at the outset is disclosed there, in which the base has at least one first groove, in which the case cover or a wall section of the case cover of the case extends. A case here means in particular the case cover, a seal and optionally the base. The documents of the cited application are hereby incorporated by this reference into the disclosure of this application. It has been shown that the connection concept of a threaded connection and/or a slot flange between the case cover and the base can be realized in a particularly advantageous manner in the heat exchanger described in the cited application.

The base can comprises a metal, in particular aluminum. An adequate thermal stability as well as an advantageous attachment of the flow channels in the through openings of the base is thereby rendered possible.

In order to ensure a further improved tight connection of the case cover, an embodiment provides that a seal is fixed between the base and the case cover.

It is provided in an embodiment that the base and/or the case cover has a bead, which can be designed to accommodate the seal. In particular the bead can be arranged in a base edge region and/or a case cover edge region.

It has been proven to be particularly effective in a sealing of the case for a front face of the case cover or of a wall section of the case cover and/or of the base to extend along the bead.

The previously mentioned embodiments are particularly suitable, preferably to improve a sealing effect, for fixing the base and the case cover relative to one another—in a bead. Optionally, one or more beads can be arranged on the case cover. A front face of the base can extend along the bead. Preferably, one or more beads can be arranged on the base and advantageously a front face of the case cover extends along the bead. In other words, one or more beads can be used in order to achieve an improved and tighter fixing of base and case cover relative to one another, in particular in comparison with the conventional art.

According to a first variant of the invention, it is provided that the case cover or a wall section of the case cover and/or of the base can meet the base bluntly by means of a front face, in particular such that the front face overlaps the bead. In other words, the width of the front face is greater than the width of the bead.

The aforementioned first variant of the invention has proven to be particularly effective, in particular with reference to a threaded connection, in particular with respect to its sealing effect, but is not restricted thereto.

In principle, a realization of the threaded connection can be carried out in various ways. A further development of the invention provides to embody the threaded connection in a particularly secure manner. Within the scope of the concept of the invention, in particular a further development has proven to be advantageous in which the base has a number of eyes for accommodating respectively one threaded connection. An eye can be arranged in particular on a corner and/or on a side of the base. The attachment of eight eyes has proven to be particularly effective—one each on a corner and a side of the base. In general, two adjacent eyes can have a spacing that lies in the range of between 40 and 90 mm, preferably between 50 and 70 mm. In principle, the number of the eyes depends on the dimensions of the base. The cited spacing ranges have proven to be particularly advantageous for preferred base dimensions and form an expedient comprise between stability and material expenditure.

The production process can be simplified if a lock nut is provided on the base or on the case to form the threaded connection.

According to a second variant of the invention, it is provided that a front face of the cover or of a wall section of the cover and/or of the base engages in a bead. The second variant has proven to be particularly effective within the context of a slot flange, preferably for a corrugated slot flange, but is not restricted thereto. In this way, it is possible to realize a particularly advantageous sealing action, and the slot flange can be used in a particularly space-saving manner. The slot flange is advantageously designed as a corrugated slot flange, since this has proven to be reliable and falls within the scope of previous production concepts.

In an embodiment of the invention, the possibility for savings in terms of material has been produced in that a base thickness is advantageously reduced radially outwards across a bead. The base thickness at least at the bead base is preferably smaller than at a point of the base which is situated further inwards along the radius. The abrasion forces for the slot flange or corrugated slot flange are correspondingly smaller than in other designs due to the reduced material thickness. One particularly advantageous compromise between the material expenditure and stability results if the ratio of a greatest base thickness to a smallest base thickness is in the range between 1.5:1 and 4:1, in particular between 2:1 and 4:1.

The base can be fixed to the housing, for example, by means of an adhesive or mechanical connection, or by means of some other connection that is suitable for the fastening of the base, of the base to the housing. In particular, the base holds the flow channels in the one or more through openings. This ensures sufficient retention of the flow channels on the base, and the core is arranged in the housing in a particularly advantageous manner.

The housing can have side walls that extend along a flow direction, and can be formed in a multiple-part manner. This renders possible a particularly simple assembly of the core in the housing and of the heat exchanger overall. It has been found to be particularly advantageous according to the further development that at least one housing part forms a housing edge, i.e., is formed in a one-piece manner. In this way, it is possible to avoid leaks as a result of joints of housing parts at a housing edge, and the assembly of the housing is made considerably simpler. At least one housing part, at least in some regions, preferably forms a first and a second side wall which are aligned at an angle with respect to one another, in a one-piece manner. This has the advantage that, in contrast to the prior art, housing side walls no longer need to be provided separately, but rather are provided in a one-piece manner in a single housing part. In particular, this reduces the number of housing parts.

Preferably, according to a first modification, at least one housing part can be designed in a U-shaped manner, for example, to provide a cover wall and at least a part of a first side wall and at least a part of a second side wall of the housing. The housing is preferably formed from two U-shaped housing parts. The two housing parts are particularly preferably formed as mating parts, such that an entire housing casing can be formed therefrom in a simple manner. It can be advantageous in particular for the two U-shaped housing parts to be formed symmetrically or virtually identically, which considerably simplifies the production process. To form a housing casing, and in particular in the case of housing parts formed in a U-shaped manner, a parting edge of housing parts is preferably arranged in the region of a side wall.

In a second modification, it has proven to be advantageous for at least one housing part to be designed in an L-shaped manner, for example, as a cover wall and side wall of the housing formed with the one-piece housing part. The housing can be formed overall from two L-shaped housing parts. In particular, the two L-shaped housing parts are formed as mating parts or largely symmetrical or identical, which considerably reduces the production expenditure. Preferably within the context of the second modification, it has proven to be advantageous to arrange a parting edge of housing parts in the region of a housing edge.

Within the context of a further embodiment of the invention, the core has a first arrangement and a second arrangement of flow channels, wherein the first arrangement and the second arrangement are arranged on opposite sides of an intermediate base. The integrity and stability of the heat exchanger are thus considerably improved, and it is nevertheless possible to provide a comparatively large flow cross section for the first fluid, for example, an exhaust gas or a charge air.

An intermediate base can be arranged parallel to and/or essentially in a plane spanned by the parting edges of housing parts. This has proven to be advantageous in particular in the case of U-shaped housing parts, in which a parting edge is arranged in the region of a side wall. This advantageously renders possible the arrangement of an intermediate base virtually centrally and parallel to the side walls and in the plane spanned by the parting edges of the U-shaped housing parts.

It is fundamentally advantageous within the scope of the above-mentioned further development that opposite parting edges of the housing parts form a gap, in particular with a gap width of 1 mm to 2 mm. The selection of the gap width is important in particular in the soldering of the components to one another, in particular to form the solder meniscus, since adequate soldering is not ensured if a gap is too large or too small.

According to a first modification of this further development, an intermediate base can engage in a gap formed by opposite parting edges of the housing parts. This stabilizes the multiple-part housing in connection with the core. Furthermore, the intermediate base lying in the gap can be used to seal the housing parts with respect to one another. In an embodiment, a web can cover parting edges of the housing parts, and can be arranged in particular on the outside on the housing. The measure provided additionally or alternatively to the first modification can likewise be used to stabilize the multiple-part housing. A web can preferably have a bead, in particular a bead that is designed additionally for reinforcement. It is particularly preferable in a further development of this second modification for a bead of the web to be designed such that it engages in a gap formed by opposite parting edges of the housing parts.

In an advantageous further development of the invention, at least two components of the heat exchanger are soldered to one another.

In an advantageous further development of the invention, all of the components of the heat exchanger, with the exception of the at least one case cover, in particular the two case covers, are soldered to one another.

Overall, according to the above-mentioned further developments relating to the housing, a particularly stable housing is provided which can be assembled using comparatively few parts. The measures explained above for the design or arrangement of the parting edges of the housing parts furthermore lead to a particularly preferable further stabilization or reinforcement of the multiple-part housing.

While the invention has proven to be particularly useful in the scope of a use of the heat exchanger in the form of a charge-air heat exchanger, in particular a charge-air cooler, for example, for the indirect or direct cooling of charge air in a charge-air supply system for an internal combustion engine of a motor vehicle, and is to be understood in this sense, and while the invention is described in detail below on the basis of examples from this field, it should nevertheless be clear that the concept described here, as claimed, is likewise useful in the scope of other applications that lie outside the examples explicitly stated and relate to other applications which are not explicitly specified. For example, the concept of the invention presented could likewise be applied to the use of a heat exchanger as an exhaust-gas heat exchanger, in particular an exhaust-gas cooler, for example, for exhaust-gas cooling in an exhaust-gas recirculation system of an internal combustion engine of a motor vehicle or as an auxiliary heater for heating the interior space of a motor vehicle. Furthermore, a use as an oil cooler is possible, in particular for cooling engine oil and/or transmission oil, or a use as a refrigerant cooler or refrigerant condenser in a refrigerant circuit of an air-conditioning system of a motor vehicle. In this context, the invention also encompasses an exhaust-gas recirculation system for an internal combustion engine, having an exhaust-gas recirculation line, a compressor and a heat exchanger in the form of an exhaust-gas heat exchanger, in particular a cooler, according to the concept of the invention. The invention also encompasses a charge-air supply system for an internal combustion engine, having a charge-air induction, an air filter, a compressor and a heat exchanger according to the concept of the invention in the form of a charge-air heat exchanger, in particular a cooler.

Exemplary embodiments of the invention are now explained below on the basis of the drawing. This drawing is not intended to illustrate the exemplary embodiments to scale; in fact, where useful for explanation the drawing is shown in schematized and/or slightly distorted form. With regard to enhancements of the teaching which can be directly gathered from the drawing, reference is made to the relevant prior art.

It should be taken into consideration thereby that various modifications and amendments relating to the shape and details of an embodiment can be carried out without departing from the general concept of the invention. The features of the invention disclosed in the above description, in the drawing and in the claims can be essential both individually and in combination for the further development of the invention. The general concept of the invention is not restricted to the precise shape or the detail of the embodiments shown and described below, or restricted to a subject matter which would be restricted in relation to the subject matter claimed in the claims. Where dimensional ranges are specified, values which fall within the specified limits are also intended to be disclosed as limit values and usable and claimable in any desired manner. The drawing shows in detail different embodiments according to the concept of the invention, wherein a realization of the core of the heat exchanger in detail as described in the applicant's German patent application cited above has proven to be advantageous.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 7 is an exploded view of FIG. 6;

FIG. 8 is a perspective partial sectional representation of the detail of a corrugated slot flange in FIG. 6;

FIGS. 9 and 10 are a sectional representation of the detail of the corrugated slot flange of the embodiment in FIG. 5 through FIG. 8;

FIG. 15 is a perspective representation of a still further embodiment of a heat exchanger according to the first or second variant of the invention, in which the housing in a second modification is formed with L-shaped housing parts and an angled parting edge;

FIG. 16 is an exploded view of the housing of the heat exchanger shown in FIG. 15;

FIG. 17b is a second perspective representation of the heat exchanger;

FIG. 18 is a perspective representation of the heat exchanger core of the further embodiment.

DETAILED DESCRIPTION

Figure 1:
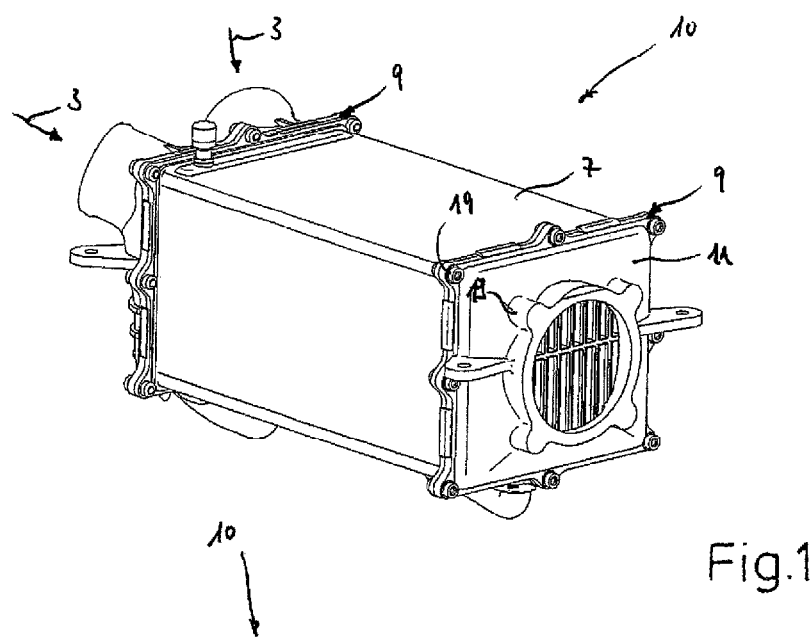
FIG. 1 shows an embodiment of a heat exchanger according to the first variant of the invention.

FIG. 1 shows a heat exchanger 10 in the form of a charge-air cooler for an indirect charge-air cooling, which can be used in a charge-air system for an internal combustion engine. A charge-air system, not shown further, moreover has a charge-air induction, an air filter and a compressor. The heat exchanger 10 represents an exemplary embodiment of the first variant of the invention, according to which a case cover 11 is fixed to a base 15 via several connections, for example, threaded connections 19.

Figure 2:
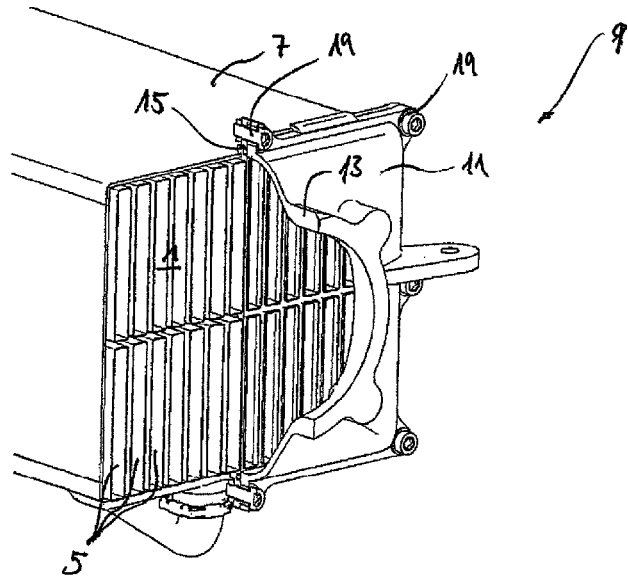
FIG. 2 shows an enlarged perspective partial sectional representation of the base area of the embodiment from FIG. 1.

As is discernible when considering together FIG. 1 and FIG. 2, the heat exchanger 10 has a core 1, which is provided for the guidance separately from one another and in a heat exchanging manner of a first fluid in the form of a charge air 3 as well as a coolant, not shown in further detail. To this end, the core 1 has a number of flow channels 5, which can be flowed through by the charge air 3, as well as a housing 7 that accommodates the flow channels 5 and can be flowed through by the coolant. In this example, the charge-air cooler 10 has two cases 9, 9', of which the front case 9 is shown in more detail in FIG. 2 through FIG. 4. Both cases 9, 9' are flow-connected to the flow channels 5 and have a case cover 11, 11', embodied differently in detail corresponding to the connections for the charge air 3. In this embodiment, both of the case covers 11, 11' are made of plastic, wherein the front cover 11 with a single diffuser arrangement 13 that is formed in one piece for the charge-air connection is shown in more detail. A base 15 is fixed to the cover 11, which base has through openings 17, shown clearly in FIG. 3, and flow channels 5 assigned to these through openings 17.

In a modified embodiment the heat exchanger can also be embodied as an exhaust-gas heat exchanger, which accordingly can be flowed through by exhaust gas, instead of by charge air 3.

Figure 3:
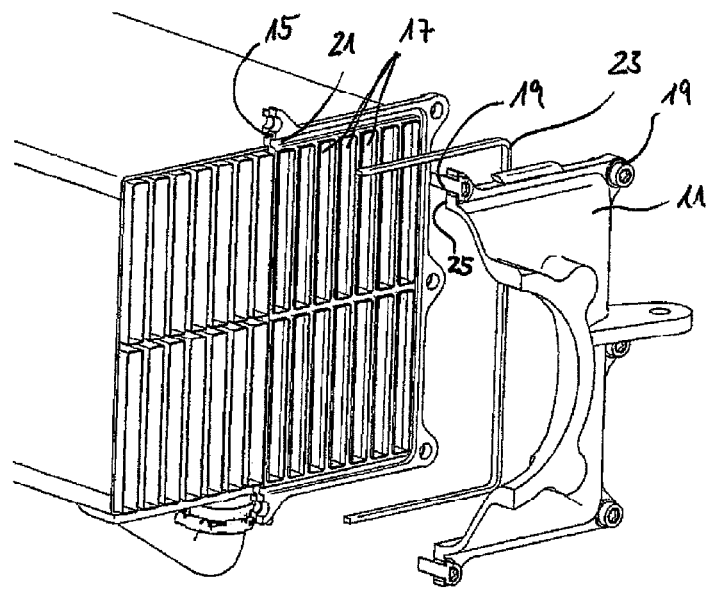
FIG. 3 is an exploded view of FIG. 2.
Figure 4:
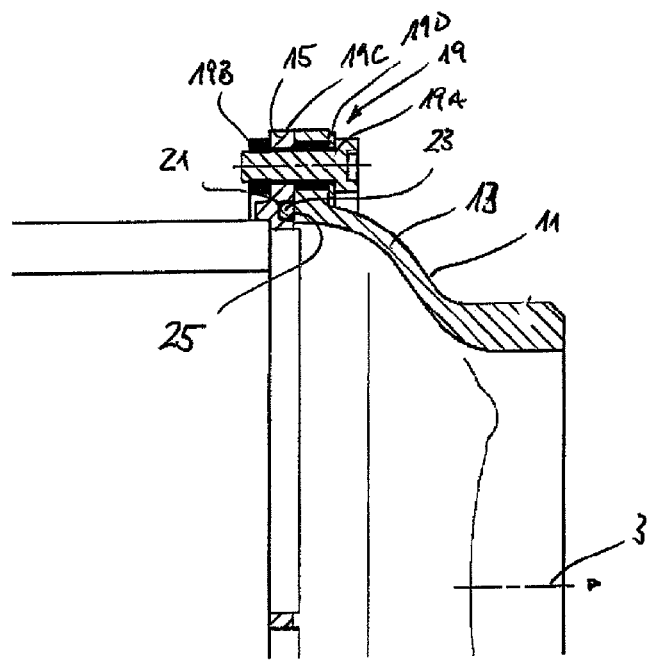
FIG. 4 is a sectional representation of the detail of a threaded connection in the embodiment according to FIG. 1 through FIG. 3.

In the embodiment shown in FIG. 1 through FIG. 4 according to the first variant of the invention, the case cover 11, 11' is fixed to the base 15 with several threaded connections 19 shown in more detail in FIG. 4. The base 15 thereby has a bead 21, in this case running completely along the base 15, in which a seal 23, here in the form of a ring seal, is accommodated.

As can be seen in FIG. 4 considered together with FIG. 1 through FIG. 3, the front face 25 of the case cover 11, 11' extends along the bead 21 and thereby meets the base 15 bluntly, wherein the front face 25 overlaps the bead 21. The seal 23 is thereby pressed by the front face 25 into the bead 21, so that a very effective seal is achieved between the base 15 and the case cover 11. The threaded connections 19 are formed in this case respectively by a screw 19A and a lock nut 19B held in a screw eye 19C. As is clearly shown in FIG. 1 through FIG. 3, respectively one screw eye 19C is arranged at respectively one corner or a side center of the base 15. The threaded connection is furthermore secured through an annular flange 19D between the lock nut 19B and the screw 19A. Through the threaded connection 19 a pressing pressure is exerted between the case cover 11 and the base 15 on the seal 23, which seal due to the pressing pressure expands in the bead 21 and effectively seals mounting surfaces between the case cover 11 and the base 15.

The screw eyes 19C are spaced apart from one another evenly—in this case the spacing should be approx. 50 to 80 mm. Lock nuts 19B are arranged for securing either on the base side facing towards the core 1 or on the case 9, 9'. In this case, the screw 19A is inserted through a box pedestal in the form of a metal sleeve on the base 1 and screwed to the nut 19B behind the base 1.

In the threaded connection 19, the groove width in the base 1 is approx. 3 mm. The seal 23, which is 2 mm wide, is pressed into the bead 21. The bead 21, 21' is thickened to the bead measurement at some places locally, in this case every 30 mm, so that the seal 23 is positioned.

Figure 5:
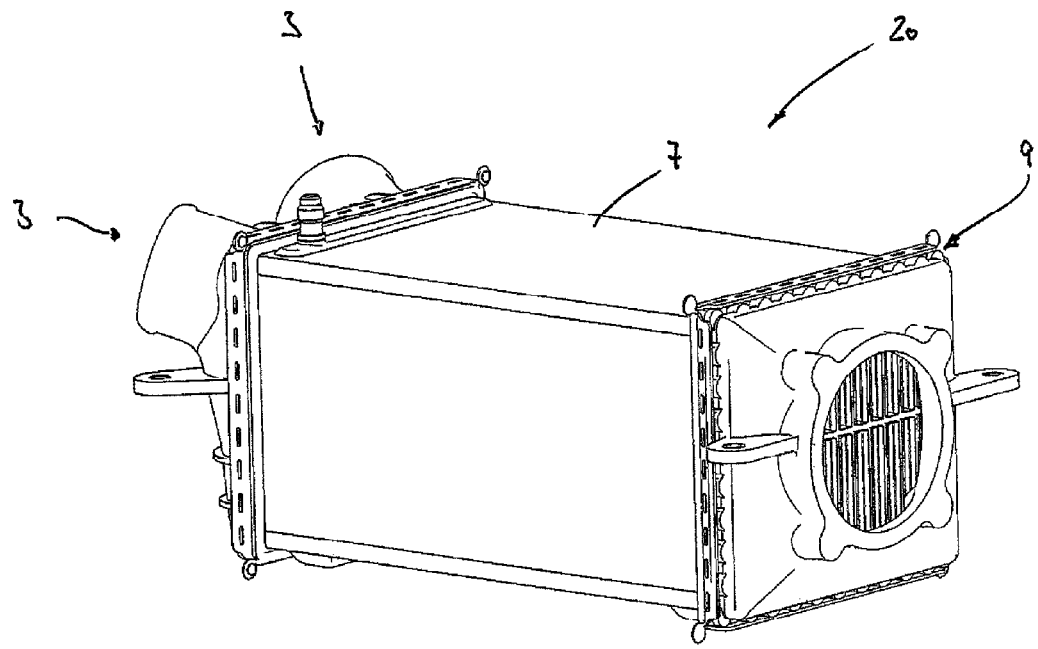
FIG. 5 shows an embodiment according to the second variant of the invention.
Figure 6:
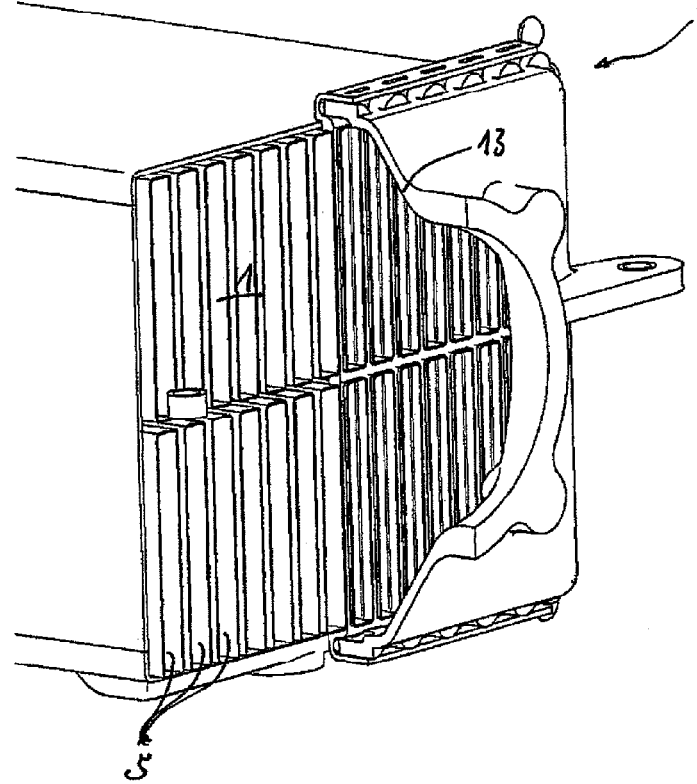
FIG. 6 is an enlarged perspective partial sectional representation of the embodiment from FIG. 5.

FIG. 5 shows a different charge-air cooler 20, likewise for an indirect charge-air cooling as described in more detail above with reference to the charge-air cooler 10, in which, in the present case, according to an embodiment of the second variant of the invention, the case cover 11 is fixed to the base 15 via a slot flange 26 as a corrugated slot flange. Identical reference symbols have been used for corresponding parts of the charge-air coolers 10 and 20.

In contrast to the embodiment described with reference to FIG. 1 through FIG. 4, in the embodiment of a charge-air cooler 20 shown here, the case cover 11' is fixed to the base 15' via a corrugated slot flange 26. For this purpose, a seal 23' is placed into the bead 21' which is formed in the present corrugated slot flange 26, which seal 23', after the case cover 11' has been placed, is pressed into the bead 21' in a sealing manner by the front face 25' of the case cover 11', which front face engages in the bead 21'. A particularly advantageous sealing of the case 9, 9' is thus achieved. The wall section 28 of the case cover 11', which wall section forms the front face 25' of the case cover 11', merges at one end into the previously described air connection, which is embodied as a diffuser 13, and at the other end, the wall section 28, along a height H of the bead 21', has ribs 27 which are semi-cylindrical in shape and which are arranged with a spacing 29. Respectively on elongated hole 31 of a flank 33 lying opposite the wall section 28 is arranged opposite the ribs 27. The material 35 of the flank 33, which material lies between the elongated holes 31 and in the present case is aluminum, is arranged opposite the spacing 29. During the closing of the slot flange 26, this material 35 can be pressed into the spacing 29 between the ribs 27 to form the corrugated slot flange. At least some of the components of the heat exchanger 10 are soldered, in particular Nocolok-soldered, to one another. In another exemplary embodiment, all the components of the heat exchanger 10, with the exception of the at least one case cover, in particular the case covers, are soldered, for example Nocolok-soldered, to one another.

Figure 10:
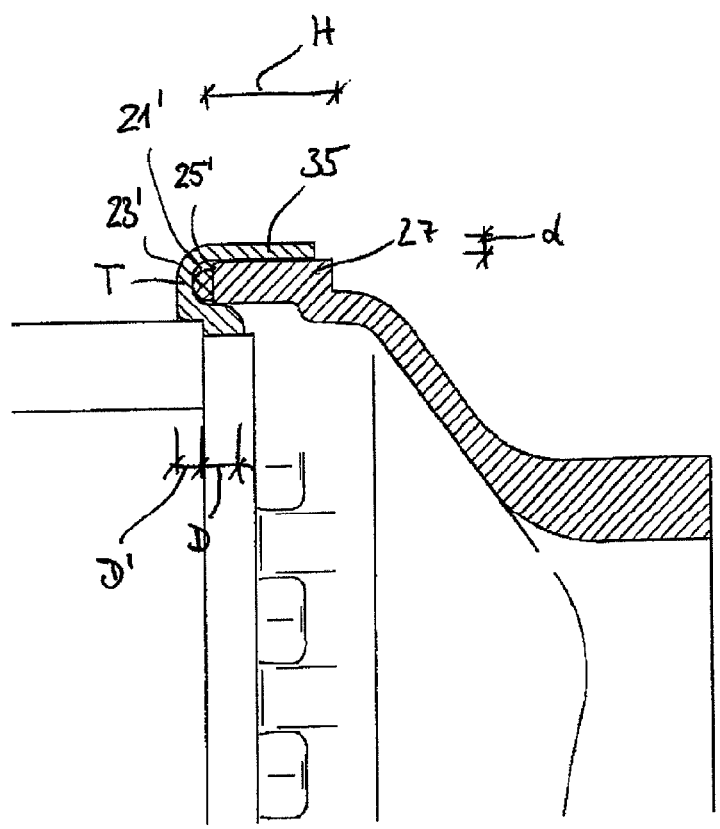

The representation shown in FIG. 10, which is equally applicable to a heat exchanger 10 and a heat exchanger 20, also shows that a base thickness is reduced radially outwards across the bead 21', in the present case, from the greatest value D in the region of the openings 17 for the flow channels 5, in the present case tubes, via a value D' in the region of the bead 21', to a smallest value d in the region of the outer flank 33 of the bead 21', the material 35 of which flank is flanged to form the corrugated slot flange 26. In the present case, the thickness of the base 15' varies from D=4 mm to d=1.5 mm, in particular from D=3 mm to d=2 mm, i.e., overall it is possible in embodiments of this type to reduce the base material by 30 to 70%, in particular by 50 to 70%. Furthermore, it has been found that it is also possible for this purpose to form the thickness at the lowest point T of the bead 21' to be even in the range of the smallest value d. It is otherwise possible regardless of the embodiment described here for the transition from the large thickness D to the thin thickness d to be of any desired design.

The described design of the bead 21' has the advantage that the base 15' permits a good tube soldering and flow channel soldering with a good bundling process in the region of the openings 17 with the large thickness D. In contrast, due to the smallest value d of the small material thickness in the region of the corrugated slot flange 26, a concept is achieved which particularly saves installation space and keeps abrasive forces low. For example, the material 35 to be flanged can be pressed away in the scope of a punching process. As a result of the material reduction in the region of the flank 33, the fastening of the case 9, 9' can be implemented with a considerably reduced installation space requirement. At least some of the components of the heat exchanger 10 are soldered, in particular Nocolok-soldered, to one another. In another exemplary embodiment, all the components of the heat exchanger 10, with the exception of the at least one case cover, in particular the case covers, are soldered, for example Nocolok-soldered, to one another.

The embodiments of a heat exchanger in the form of a charge-air cooler 30, 40, 50, which embodiments are explained on the basis of FIG. 11 through FIG. 16, show advantageous examples of a design of a housing 7 as is generally shown in the previously described FIG. 1 through FIG. 10. The modifications of a housing 37, 47, 57 shown in FIG. 11 through FIG. 16 can be used, as required, for a housing 7 of FIG. 1 through FIG. 10. The embodiments of a heat exchanger 30, 40, 50 described in FIG. 11 through FIG. 16 are illustrated merely by way of example as embodiments according to the second variant of the invention, in which a case cover of the heat exchanger 30, 40, 50 is fixed to the base as a support flange. The statements made with regard to FIG. 11 through FIG. 16 can be applied equally to an embodiment (not shown) of a heat exchanger in which the case cover is fixed to the base by means of a threaded connection. Overall, the features disclosed in FIG. 1 through FIG. 10, in particular relating to the fixing of the case cover to the base, can be combined in any manner both individually and in combination with the features disclosed in FIG. 11 through FIG. 16, in particular regarding the embodiment of a housing 37, 47, 57, individually or in combination and used depending on the intended use. In this respect, in the exemplary embodiments, the same reference symbols have been used for identical parts or parts with the same function. At least some of the components of the heat exchanger are soldered, in particular Nocolok-soldered, to one another. In another embodiment, all the components of the heat exchanger, with the exception of the at least one case cover, in particular the case covers, are soldered, for example Nocolok-soldered, to one another.

Figure 11:
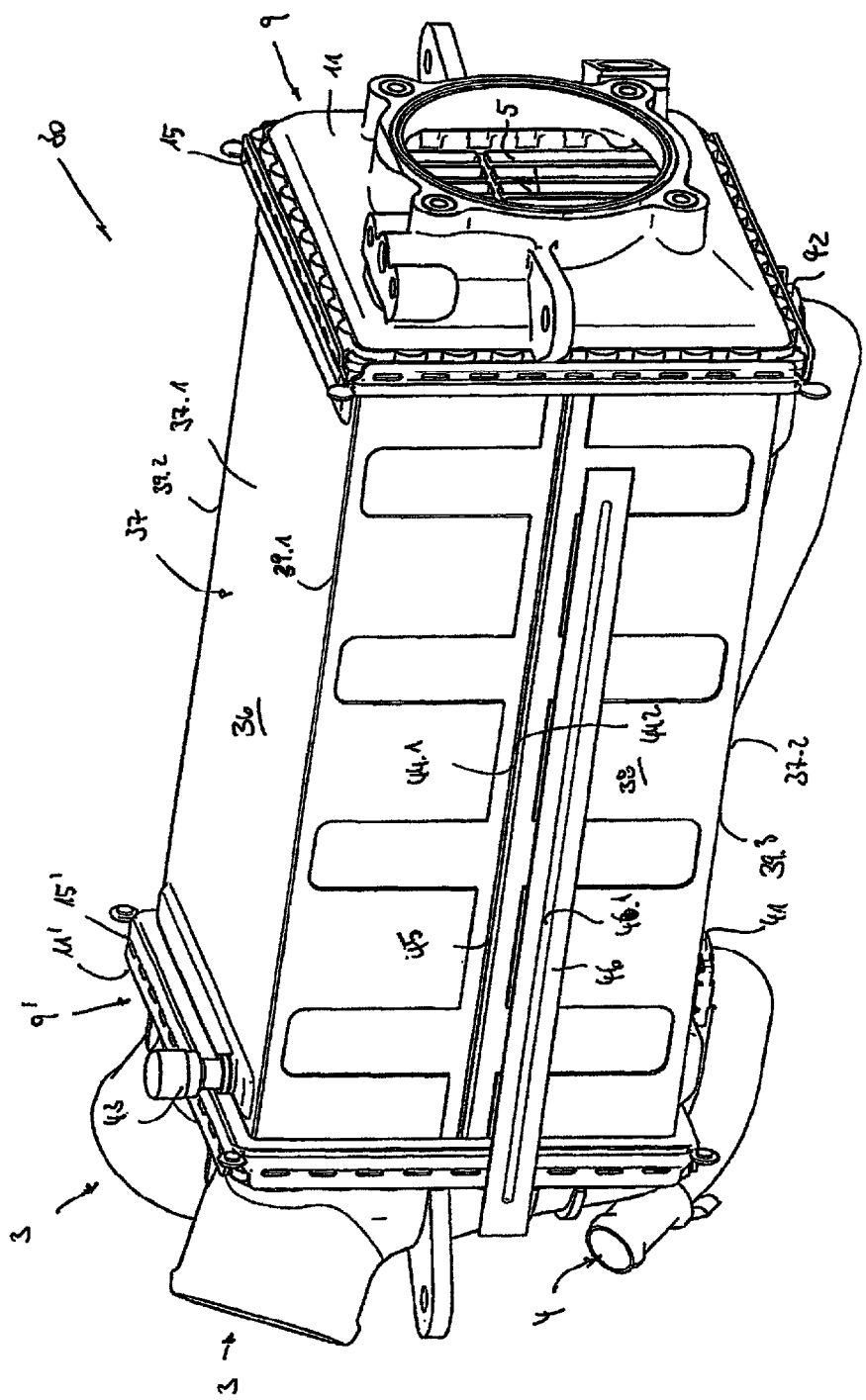
FIG. 11 is a perspective representation of an embodiment of a heat exchanger according to the first or second variant of the invention, in which the housing is formed in a first modification of two U-shaped housing parts and is reinforced with a web with a reinforcement bead shown in exploded view.

FIG. 11 shows a heat exchanger 30 in the form of a charge-air cooler as an embodiment according to the second variant of the invention, similar to the heat exchanger 20 described in FIG. 5. This heat exchanger again has a core 1 with a number of flow channels 5 which can be flowed through by charge air 3 and which are accommodated in a housing 37 which can be flowed through by the coolant. As is explained on the basis of FIG. 5 through FIG. 10, cases 9, 9' are flow-connected to the flow channels 5 and have a case cover 11, 11' which is designed differently in detail corresponding to the connections for the charge air 3. These case covers are in each case fixed to the base 15, 15' corresponding to the manner explained with regard to FIG. 5 through FIG. 10. The base 15, 15' is fixed to the housing, wherein the flow channels 5 penetrate the through openings 17 shown in more detail in FIG. 7.

Figure 12:
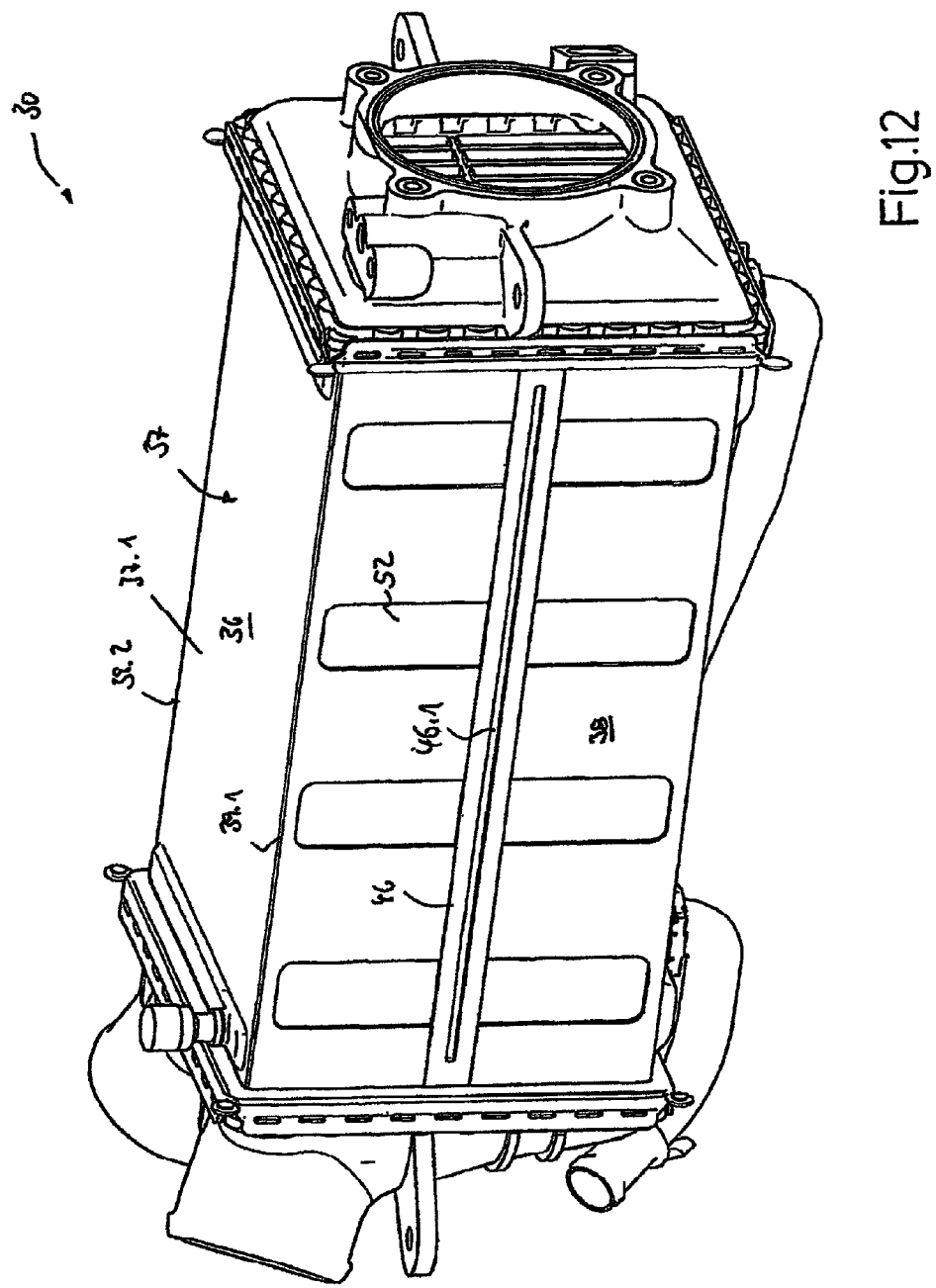
FIG. 12 is a perspective representation of the heat exchanger of FIG. 11.

The housing 37, which is shown in a perspective view in FIG. 12 and as an exploded representation in FIG. 11, has two cover walls 36 and two side walls 38, with a cover wall 36 being aligned essentially at right angles to the side wall 38. An upper housing part 37.1, which is U-shaped in the present case, forms a first and a second upper housing edge 39.1, 39.2, while a second lower housing part 37.2 forms a first lower housing edge 39.3 and a second lower housing edge 39.4 (not shown). The upper housing part 37.1 is formed as a mating part to be essentially identical to the lower housing part 37.2, with the exception of coolant connections 41, 42, 43. Coolant 4 is supplied to and discharged from the interior of the housing 37, in a manner not shown in further detail, via the coolant connections 41, 42, 43 in order to purge the flow channels 5. In the present case, the entire housing casing of the housing 37 is formed by means of the upper housing part 37.1 and the lower housing part 37.2 The parting edges 44.1 and 44.2 of the upper housing part 37.1 and of the lower housing part 37.2 in the present case are arranged in the region of a side wall 38 of the housing 37 and are located opposite one another so as to form a gap 45. For the sealing closure of the housing 37, the gap 45 is covered by a web 46, with a stiffening bead 46.1 of the web engaging in the gap 45. In addition to sealing closure of the housing 37, the attachment of the web 46 means that the stability of the housing 37, which is already comparatively high as a result of the one-piece design of the upper housing part 37.1 and of the lower housing part 37.2, is improved still further. At least some of the components of the heat exchanger are soldered, in particular Nocolok soldered, to one another. In another exemplary embodiment, all the components of the heat exchanger, with the exception of the at least one case cover, in particular the case covers, are soldered, for example Nocolok soldered, to one another.

Figure 13:
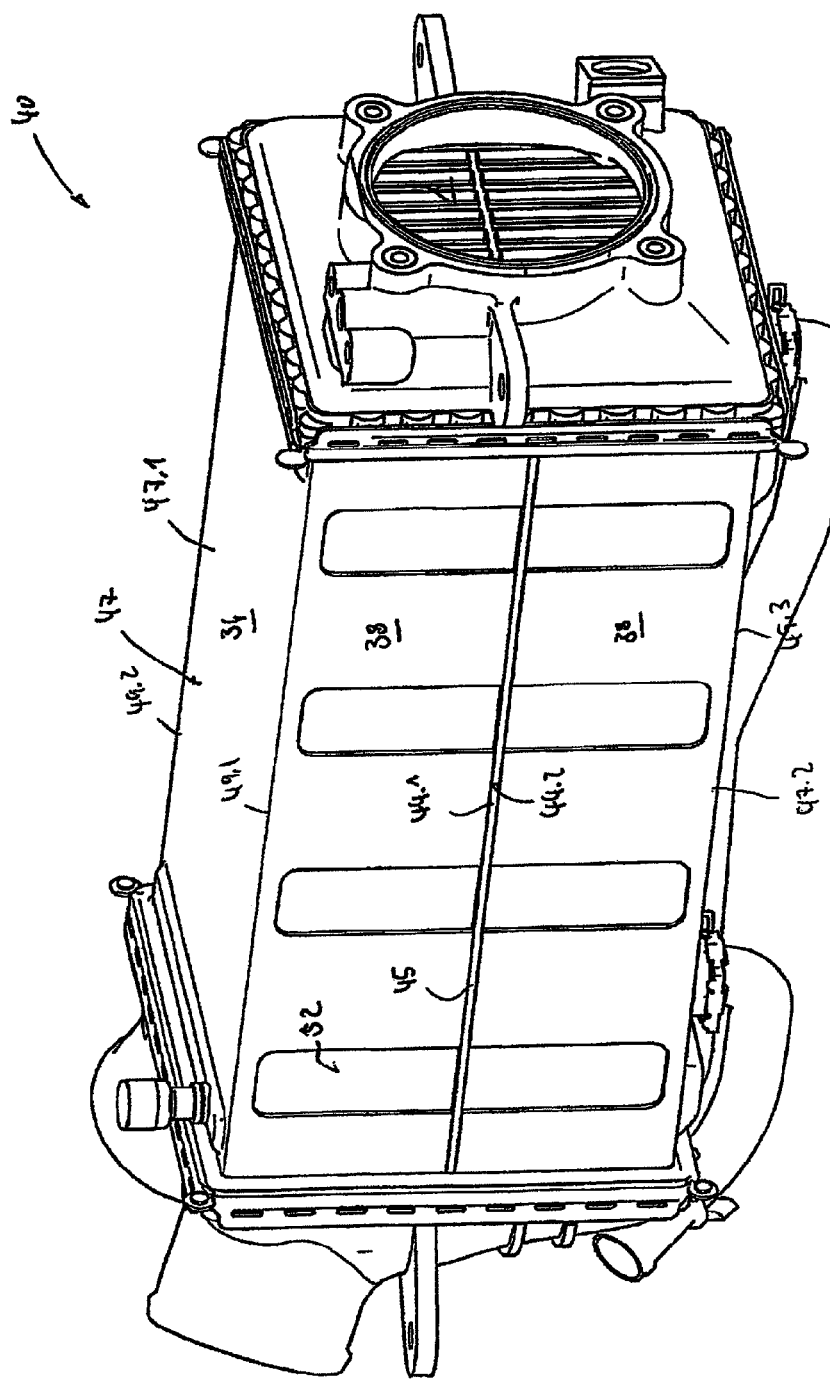
FIG. 13 is a perspective representation of another embodiment of the heat exchanger similar to that according to FIG. 11 and FIG. 12, wherein in contrast an intermediate base engages in a gap formed by opposite parting edges of U-shaped housing parts.
Figure 14:
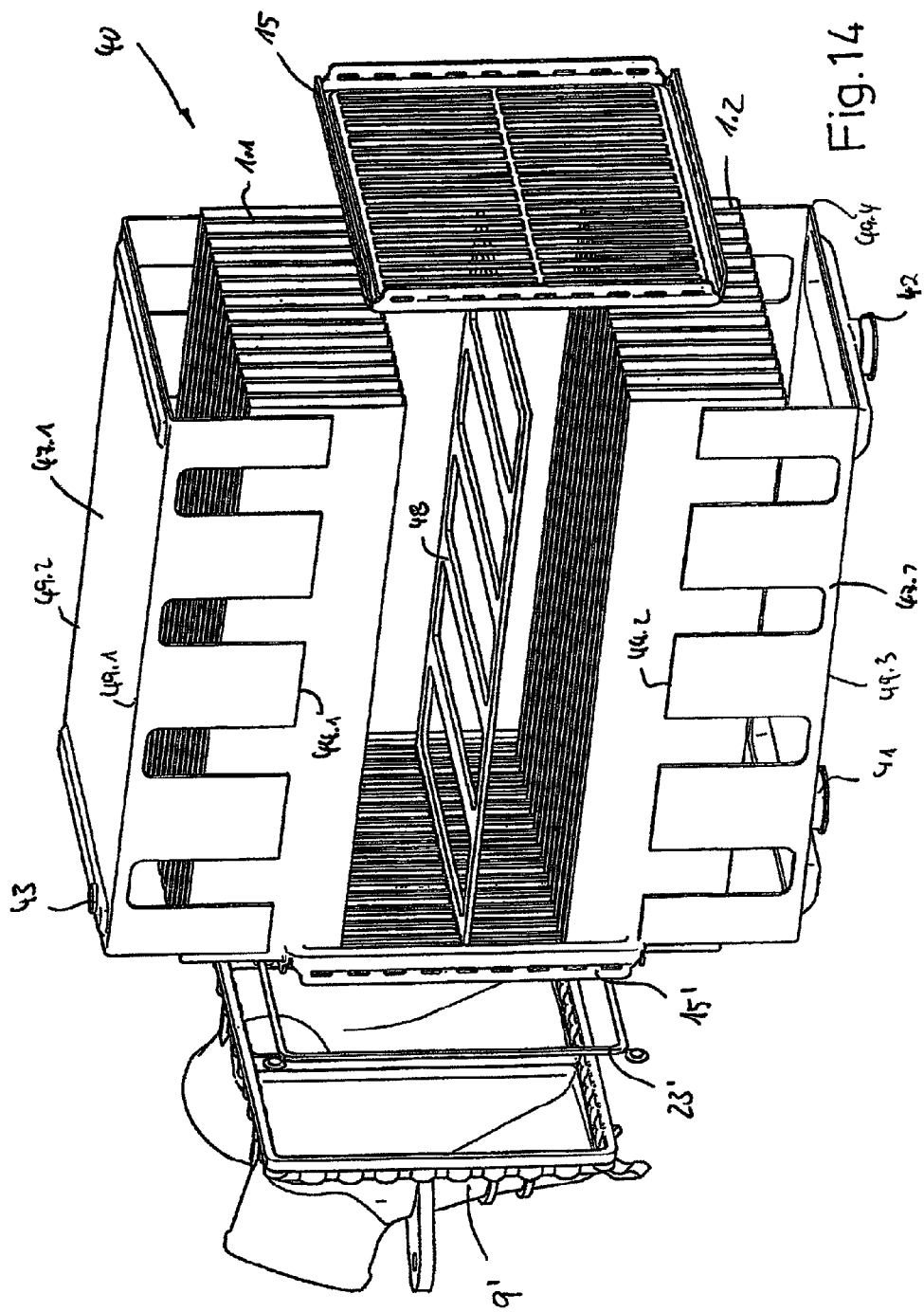
FIG. 14 is an exploded view of the heat exchanger shown in FIG. 13.

FIG. 13 shows in perspective representation and FIG. 14 shows an exploded representation a further embodiment of a heat exchanger 40 in the form of a charge-air cooler, the housing 47 of which is again formed from an upper housing part 47.1 and a lower housing part 47.2, wherein the housing parts 47.1 and 47.2 are formed in a U-shaped manner virtually identical to the housing parts 37.1 and 37.2 of FIG. 11. The opposite parting edges 44.1, 44.2 of the housing parts 47.1, 47.1 again form a gap 45, in which an intermediate base 48, shown in more detail in FIG. 14, engages. In this case the core 1 has a first arrangement 1.1 and a second arrangement 1.2 of flow channels 5, with the first arrangement 1.1 and the second arrangement 1.2 being arranged on opposite sides of the intermediate base 48. At least some of the components of the heat exchanger are soldered, in particular Nocolok soldered, to one another. In another exemplary embodiment, all the components of the heat exchanger, with the exception of the at least one case cover, in particular the case covers, are soldered, for example Nocolok soldered, to one another.

It can be seen from the representations in FIG. 11 through FIG. 14 that a heat exchanger 30, 40 having the U-shaped housing parts 37.1, 37.2, 47.1, 47.2 can be bundled in a particularly simple manner, wherein in the embodiment shown in FIG. 11 and FIG. 12, a web 46 is used to seal the gap 45 between the parting edges 44.1 and 44.2, while in the embodiment shown in FIG. 13 and FIG. 14, an intermediate base 48 is used to seal the gap 45. The housing parts 37.1, 37.2 and 47.1, 47.2 in the present case are soldered to one another—alternatively or additionally the housing parts can also be welded to one another. In a way which is not shown, the housing parts can also additionally or alternatively be joined to one another mechanically.

FIG. 15 shows a further embodiment of a heat exchanger 50, in which a housing 57 is formed in the manner shown in FIG. 16 with an upper L-shaped housing part 57.1 and a lower L-shaped housing part 57.2. Again, each L-shaped housing part 57.1, 57.2 forms a housing edge 59.1 and 59.2, and in each case one cover wall 56 and side wall 58 of the housing 57. In the embodiment shown in FIG. 15 and FIG. 16, a cover wall 56 is provided in each case with stiffening areas and/or openings 51, while in the embodiments shown in FIG. 11 through FIG. 14, stiffening areas 52 and/or openings are formed on a side wall 38. At least some of the components of the heat exchanger are soldered, in particular Nocolok soldered, to one another. In another exemplary embodiment, all the components of the heat exchanger, with the exception of the at least one case cover, in particular the case covers, are soldered, for example Nocolok soldered, to one another.

As can be seen from FIG. 16, the first housing part 57.1 and the second housing part 57.2 are again formed as mating parts, such that through the assembly of the same at a parting edge 54.1, 54.2 the entire housing casing of the housing 57 is completed. In the present case, parting edges 54.2 lying respectively diagonally opposite are provided with a bent over tab 55 which—as well as stiffening the L-shaped housing part 57.1, 57.2—also serves the improved positive attachment of the housing parts 57.1, 57.2. In this regard, advantageously in each case one parting edge 54.1 is pushed under the tab 55 of the opposite parting edge 54.2 in order to provide the housing casing of the housing 57. The housing parts 57.1, 57.2 are soldered to one another in the present case. At least some of the components of the heat exchanger are soldered, in particular Nocolok soldered, to one another. In another exemplary embodiment, all the components of the heat exchanger, with the exception of the at least one case cover, in particular the case covers, are soldered, for example Nocolok soldered, to one another.

Overall, the embodiments of a housing 37, 47, 57 shown in FIG. 11 through FIG. 16 render possible a realization of a multiple-part and nevertheless particularly stable housing.

In summary, a heat exchanger 10, 20, 30, 40, 50 is disclosed, in particular a charge-air heat exchanger or exhaust-gas heat exchanger, for an exchange of heat between a first fluid, in particular a charge air 3 or an exhaust gas, and a second fluid, in particular a coolant, which heat exchanger has: separate and heat-exchanging guidance, in the core 1, of the first and second fluids, which core 1 has a number of flow channels 5 which can be flowed through by the first fluid and a housing 7, 37, 47, 57 which accommodates the flow channels 5 and which can be flowed through by the second fluid; at least one case cover 11, it which is flow-connected to the flow channels 5, a base 15, 15' which is fixed to the case cover 11, 11' and which is provided with one or with a plurality of through openings 17 for flow channels 5. In order to obtain an advantageous connection of the case cover 11, 11' to the base 15, 15', in particular in the event that the case cover 11, 11' and base 15, 15' are composed of different materials, the invention provides that the case cover 11, 11' is fixed to the base 15, 15' via one or more connections as a screw connection 19 and/or slot flange 26.

Figure 17A:
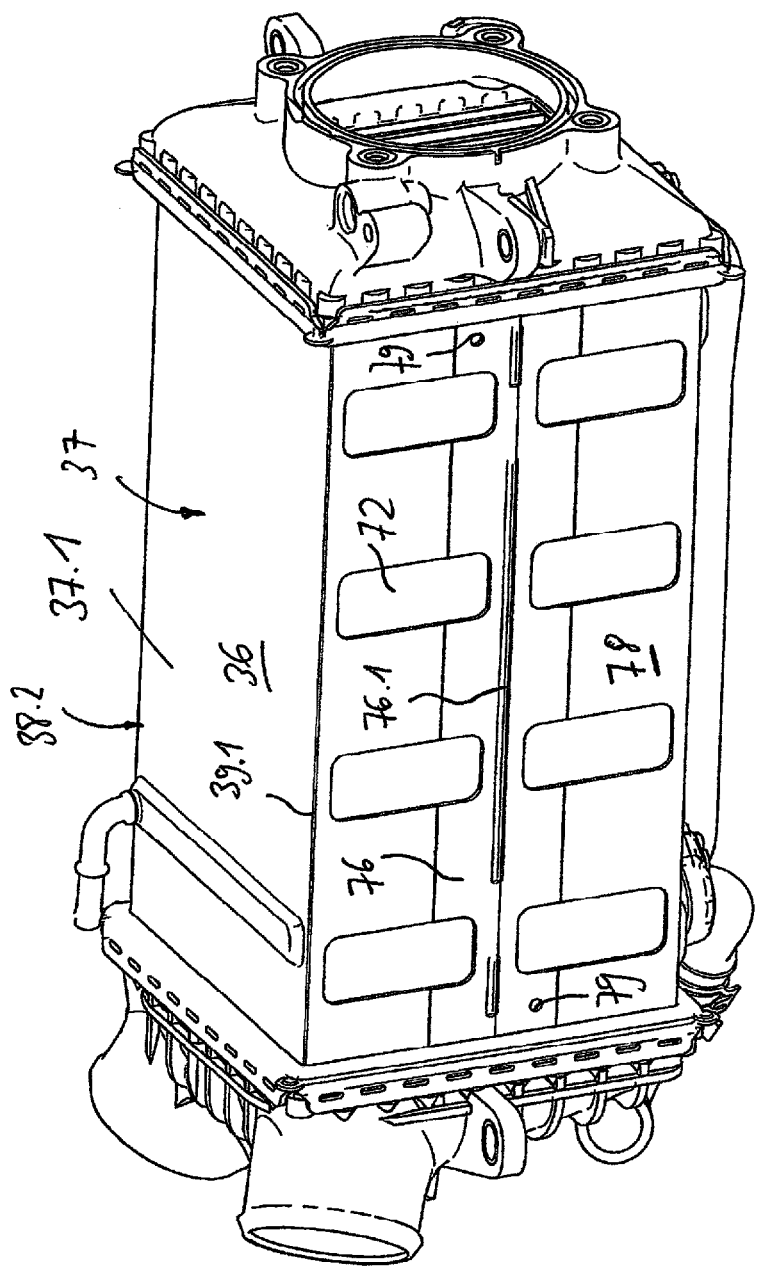
FIG. 17a is a first perspective representation of a further embodiment of the heat exchanger.

FIG. 17a shows a first perspective representation of a further embodiment of the heat exchanger and FIG. 17b shows a second perspective representation of the heat exchanger, wherein in FIG. 17b the web 76 is shown in an exploded view. Compared to the previous embodiments, the web 76 is embodied to be wider and has openings 73, in particular tongue-like openings.

The housing 37 with the cover walls 36 is embodied such that the at least one cover wall 36 has openings 72. The openings 72 correspond to the openings 73. The openings 72 are embodied essentially in a tongue-like manner. The web 76 likewise has a stiffening bead 76.1. Furthermore, the web 76 does not have openings 79.

FIG. 18 shows a perspective representation of the heat exchanger core of the further embodiment. The features shown in FIG. 18 have the same reference symbols as in the previous figures.

Figure 19:
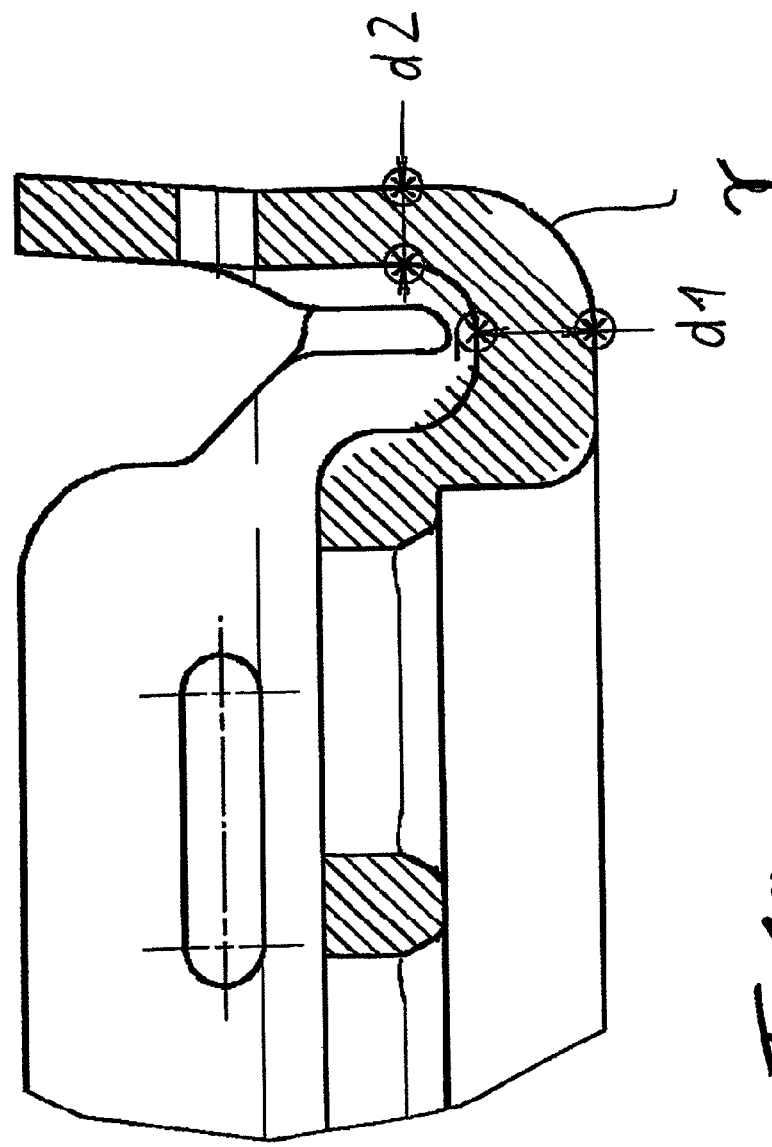
FIG. 19 is a sectional representation of a tube sheet section.

FIG. 19 shows a sectional representation of a tube sheet section. The tube sheet has an essentially peripheral groove. At least a radius r is provided in the area of the groove bottom. The radius r assumes in particular values of 1 to 5 mm, in particular values of 2 mm to 3 mm. The base has a thickness d1 in the groove bottom. This thickness d1 merges into the thickness d2. The thickness d2 is essentially arranged according to the radius r. The thickness d1 has a value of, for example, the value 3 mm. The thickness d2 has the value, for example, of 2 mm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger for heat exchange between a first fluid, in particular a charge air or an exhaust gas, and a second fluid, in particular a coolant, the heat exchanger comprising:
   a core configured to guide the first and second fluid separately from one another and in a heat-exchanging manner, the core having a plurality of flow channels that are configured such that the first fluid is flowable there through;
   a housing configured to accommodate the flow channels, the housing being configured such that the second fluid is flowable there through;
   at least one case cover that is flow-connected to the flow channels; and
   a base being fixable to the case cover and having one or more through openings for the flow channels, wherein the case cover is fixable to the base via one or more connections, the connections being configured as a slot flange comprising a wall of the base having a plurality of discrete through-openings, wherein the case cover has a plurality of discrete ribs that project from an outer surface of the case cover, the plurality of discrete ribs opposing the wall having the plurality of discrete through-openings, and wherein the plurality of discrete ribs are positioned so as to be offset from the plurality of discrete through-openings, such that the plurality of discrete ribs directly contact respective wall spaces provided between every two respective adjacent through-openings.

2. The heat exchanger according to claim 1, wherein the case cover and the base are formed of different materials.

3. The heat exchanger according to claim 1, wherein the base is composed of a metal, in particular of aluminum.

4. The heat exchanger according to claim 1, wherein the case cover is composed of a non-metal, in particular a plastic, fibrous composite, or a ceramic or mixtures thereof.

5. The heat exchanger according to claim 1, wherein the case cover and a seal are parts of a case.

6. The heat exchanger according to claim 1, wherein a seal is disposed between the base and the case cover.

7. The heat exchanger according to claim 1, wherein the base has a bead in a base edge region.

8. The heat exchanger according to claim 7, wherein a seal is arranged in the bead.

9. The heat exchanger according to claim 7, wherein a front face of the case cover or of a wall section of the case cover extends along the bead.

10. The heat exchanger according to claim 7, wherein the case cover or a wall section of the case cover meets the base bluntly via a front face, and wherein the front face overlaps the bead.

11. The heat exchanger according to claim 7, wherein a front face of the case cover or of a wall section of the case cover engages in the bead.

12. The heat exchanger according to claim 1, wherein the flange is formed as a slot flange or as a corrugated slot flange.

13. The heat exchanger according to claim 1, wherein a base thickness is reduced radially outwards across a bead in a ratio of a greatest base thickness to a smallest base thickness in a range between 1.5:1 and 4:1 or between 2:1 and 4:1.

14. The heat exchanger according to claim 1, wherein a base thickness at least at a bead base is smaller than at a point of the base, which is situated further inwards along a radius.

15. The heat exchanger according to claim 1, wherein the base is fixable to the housing and/or the base accommodates the flow channels in the one or more through openings.

16. The heat exchanger according to claim 1, wherein the housing has side walls that extend along a flow direction, wherein the housing is formed in a multiple-part manner, and wherein at least one housing part forms a housing edge.

17. The heat exchanger according to claim 16, wherein at least one housing part, at least in some areas, forms in one piece a first and a second side wall aligned at an angle to one another.

18. The heat exchanger according to claim 1, wherein at least one housing part is formed in a U-shaped manner, or wherein the housing is formed of two U-shaped housing parts that are configured to be mated with one another.

19. The heat exchanger according to claim 18, wherein a parting edge of the housing parts is arranged in a region of a side wall.

20. The heat exchanger according to claim 18, wherein at least one housing part is formed in an L-shaped manner, or wherein the housing is formed of two L-shaped housing parts that are formed as mating parts.

21. The heat exchanger according to claim 18, wherein a parting edge of housing parts is arranged in a region of a housing edge.

22. The heat exchanger according to claim 1, characterized in that the core has a first arrangement and a second arrangement of flow channels, wherein the first arrangement and the second arrangement are arranged on opposite sides of an intermediate base.

23. The heat exchanger according to claim 18, wherein an intermediate base is arranged parallel to and/or essentially in a plane spanned by parting edges of the housing parts.

24. The heat exchanger according to claim 18, wherein opposite parting edges of housing parts form a gap.

25. The heat exchanger according to claim 18, wherein an intermediate base engages in a gap formed by opposite parting edges of the housing parts.

26. The heat exchanger according to claim 18, wherein a web covers parting edges of the housing parts, and wherein the web is arranged on an outside on the housing.

27. The heat exchanger according to claim 26, wherein the web has a bead or a stiffening bead.

28. The heat exchanger according to claim 1, wherein a bead of a web is configured to engage in a gap formed by opposite parting edges of housing parts.

29. The heat exchanger according to claim 28, wherein the housing parts are joined to one another adhesively and/or mechanically.

30. The heat exchanger according to claim 1, wherein the heat exchanger is a charge-air heat exchanger or charge-air cooler.

31. The heat exchanger according to claim 1, wherein the heat exchanger is an exhaust gas heat exchanger or an exhaust gas cooler.

32. The heat exchanger according to claim 1, wherein at least two components of the heat exchanger are soldered to one another.

33. The heat exchanger according to claim 1, wherein all of the components of the heat exchanger with the exception of the at least one case cover, in particular the two case covers, are soldered to one another.

34. Use of a heat exchanger according to claim 1, as a charge-air cooler for direct or indirect cooling of charge air in a charge-air system for an internal combustion engine of a motor vehicle.

35. A heat exchanger for heat exchange between a first fluid, in particular a charge air or an exhaust gas, and a second fluid, in particular a coolant, the heat exchanger comprising:
  a core configured to guide the first and second fluid separately from one another and in a heat-exchanging manner, the core having a plurality of flow channels that are configured such that the first fluid is flowable there through;
  a housing configured to accommodate the flow channels, the housing being configured such that the second fluid is flowable there through;
  a base having a plurality of through openings, the plurality of flow channels extending into the plurality of through openings, the base also having a peripheral groove;
  a compressible seal member mounted in the peripheral groove; and
  a case cover having an interior in fluid communication with the flow channels,
  wherein the case cover is mounted to the base such that a portion of the case cover compresses the compressible seal member in the groove, wherein the case cover is secured to the base without soldering, and wherein the base includes a flange defining a first wall of the peripheral groove, the first wall including a plurality of slots, wherein the case cover includes a plurality of discrete ribs that project from an outer surface of the case cover, wherein the plurality of discrete ribs oppose the first wall that includes the plurality of slots, and wherein the case cover is secured to the base by crimping the flange against the plurality of ribs.

36. The heat exchanger according to claim 1, wherein the plurality of discrete through openings comprise a plurality of elongate slots having a length direction parallel to a longitudinal direction of the slot flange.

37. The heat exchanger according to claim 35, wherein the compressible seal member is formed from a material different than a material of the case cover.

38. The heat exchanger according to claim 35, wherein the plurality of discrete ribs are positioned so as to be offset from the plurality of slots, such that each respective rib directly contacts a respective wall space provided between every two respective adjacent slots.

39. The heat exchanger according to claim 22, wherein the intermediate base has a plurality of openings that extend in a direction perpendicular to openings of the flow channels of the first arrangement and the second arrangement.

* * * * *